US008645540B2

(12) United States Patent
Gasca, Jr. et al.

(10) Patent No.: US 8,645,540 B2
(45) Date of Patent: Feb. 4, 2014

(54) AVOIDING UNNECESSARY PROVISIONING/DEPROVISIONING OF RESOURCES IN A UTILITY SERVICES ENVIRONMENT

(75) Inventors: Miguel E. Gasca, Jr., San Bernardino, CA (US); Elfred Pagan, Austin, TX (US); Abigail A. Tittizer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1047 days.

(21) Appl. No.: 10/902,589

(22) Filed: Jul. 29, 2004

(65) Prior Publication Data

US 2006/0036735 A1 Feb. 16, 2006

(51) Int. Cl.
G06F 15/173 (2006.01)
(52) U.S. Cl.
USPC .......................................... 709/226; 709/223
(58) Field of Classification Search
USPC ........................................................ 709/226
See application file for complete search history.

(56) References Cited

U.S. PATENT DOCUMENTS

| 5,761,692 | A | * | 6/1998 | Ozden et al. ...................... 711/4 |
| 5,768,544 | A | | 6/1998 | Hauck |
| 5,903,757 | A | | 5/1999 | Gretz et al. .................... 395/704 |
| 6,182,022 | B1 | | 1/2001 | Mayle et al. |
| 6,411,922 | B1 | | 6/2002 | Clark et al. ........................ 703/2 |
| 6,477,147 | B1 | * | 11/2002 | Bocking et al. ............... 370/236 |
| 6,556,574 | B1 | * | 4/2003 | Pearce et al. .................. 370/401 |
| 6,597,907 | B1 | | 7/2003 | Pruitt et al. |
| 6,792,548 | B2 | * | 9/2004 | Colvin ............................. 726/30 |
| 6,889,169 | B2 | | 5/2005 | Kirshenbaum et al. |
| 6,983,462 | B2 | * | 1/2006 | Savov et al. ................... 718/104 |
| 7,058,946 | B2 | * | 6/2006 | Acharya et al. ............... 718/102 |
| 7,257,515 | B2 | | 8/2007 | Haeuptle |
| 7,373,665 | B2 | * | 5/2008 | Williamson et al. ............ 726/22 |
| 7,379,884 | B2 | * | 5/2008 | Barsness et al. ................... 705/1 |
| 7,577,746 | B2 | * | 8/2009 | Shima ............................ 709/229 |
| 2002/0049838 | A1 | | 4/2002 | Sylor et al. |
| 2002/0107026 | A1 | | 8/2002 | Agrawal et al. |
| 2002/0150054 | A1 | | 10/2002 | Sohraby et al. |
| 2002/0183971 | A1 | | 12/2002 | Wegerich et al. |
| 2002/0198984 | A1 | | 12/2002 | Goldstein et al. |

(Continued)

OTHER PUBLICATIONS

USPTO Office Action in U.S. Appl. No. 12/119,224; Mar. 9, 2009.

(Continued)

*Primary Examiner* — Azizul Choudhury
(74) *Attorney, Agent, or Firm* — William H. Steinberg; Gregory K. Goshorn; Greg Goshorn, P.C.

(57) ABSTRACT

Provided is a method for the deployment of resources in a utility services environment, in which various resources are allocated and deallocated according to a calculated need for those resources. Provides is a "weighted" period of time, or "window," corresponding to requests for a particular resource. A configuration file stores information on each resource in the utility services environment and a weighted period of time value corresponding to each resource. A list of provisioning/deprovisioning, or "resource." actions corresponding to each resource is maintained. Provisioning/deprovisioning actions are correlated with times of execution. When a request for a provisioning/deprovisioning action is received, the list of actions and the configuration file are examined to determine whether or not the requested action has been executed with respect to the particular action within the weighted period of time. If so, the request is discarded without any action taken. If not, the action is executed.

3 Claims, 6 Drawing Sheets

(56) References Cited

U.S. PATENT DOCUMENTS

| | | |
|---|---|---|
| 2003/0023716 A1 | 1/2003 | Loyd |
| 2003/0056126 A1 | 3/2003 | O'Connor et al. |
| 2003/0061091 A1 | 3/2003 | Amaratunga et al. |
| 2003/0067493 A1* | 4/2003 | Jones .................... 345/808 |
| 2003/0084145 A1 | 5/2003 | Ramachandran et al. .... 709/224 |
| 2003/0093527 A1 | 5/2003 | Rolia ...................... 709/226 |
| 2003/0101213 A1* | 5/2003 | Wright .................... 709/203 |
| 2003/0139918 A1 | 7/2003 | Hardwick et al. |
| 2003/0142139 A1 | 7/2003 | Brown et al. |
| 2003/0142141 A1 | 7/2003 | Brown et al. |
| 2003/0171120 A1* | 9/2003 | Mustapha ................. 455/445 |
| 2004/0098478 A1 | 5/2004 | Koetke et al. |
| 2005/0243761 A1* | 11/2005 | Terry et al. ................ 370/328 |

OTHER PUBLICATIONS

Response to USPTO Office Action in U.S. Appl. No. 12/119,224; Jul. 9, 2009.

USPTO Notice of Allowance in U.S. Appl. No. 12/119,224; Sep. 24, 2009.

Applicant Summary of Interview in U.S. Appl. No. 10/902,591; Sep. 10, 2007.

Final Office Action in U.S. Appl. No. 10/902,591; Aug. 10, 2006.

Notice of Allowance in U.S. Appl. No. 10/902,591; Apr. 9, 2008.

USPTO Office Action in U.S. Appl. No. 10/902,591; Mar. 7, 2006.

USPTO Office Action in U.S. Appl. No. 10/902,591; Oct. 17, 2007.

Response to Office Action in U.S. Appl. No. 10/902,591; Jul. 7, 2006.

Response to Office Action in U.S. Appl. No. 10/902,591; Sep. 10, 2007.

Response to Office Action in U.S. Appl. No. 10/902,591; Feb. 19, 2008.

* cited by examiner

AVOIDING UNNECESSARY PROVISIONING/DEPROVISIONING OF RESOURCES IN A UTILITY SERVICES ENVIRONMENT

TECHNICAL FIELD

The present invention relates generally to management of a utility services environment and, more specifically, to a method for the provisioning and deprovisioning of resources based upon non-anomalistic conditions.

BACKGROUND OF THE INVENTION

International Business Machines Corp. (IBM) of Armonk, N.Y. has frequently implemented new paradigms in business computing. Currently IBM is deploying products and services to support the "On Demand Business." An "On Demand Business" is an enterprise whose business processes are integrated end-to-end across the company and with key partners, suppliers and customers and which can respond with speed to any customer demand, market opportunity or external threat. The information technology (IT) infrastructure necessary to support the On Demand Business must be flexible and variable, i.e. able to meet fluctuating demand levels. One technique employed to provide a flexible and variable IT infrastructure is a utility computing service. Utility computing is information technology (IT) services based upon "power by the hour" in which a client pays only for the level of computing services actually used. In this paradigm, a resource may be allocated or deallocated based upon a customer's actual need for the resource.

Customers of a utility computing infrastructure transform their IT environment into a variable resource and pay only for the actual computing services received. The utility management infrastructure (UMI) provides the tools and services to effectively manage the utility computing environment. Like electricity, water and gas, IT is treated as another utility. Thus, by eliminating the responsibility of building and maintaining IT operations, providing necessary education and training to administrators, and having to comply with applicable regulations, the customer can focus on their core business while enjoying variable pricing, automated processes and the invaluable resilience and responsiveness of a shared infrastructure provided by the utility provider.

Customers transitioning from a dedicated IT environment to a utility computing environment may be concerned that needed resources are available and that the resources that are available are actually being utilized. Often, a customer is able to modify computing capacity and allocate and/or de-allocate computing resources. Although this approach provides customers with a dynamic pool of needed resources, the customer must be aware of the specific demand for a particular application in order to effectively manage the allocation/deallocation process.

Other programs provide for an automatic allocation/deallocation of resources based upon the use of the resources. However, current systems do not provide a way to ensure that resources are allocated based upon actual need rather than merely an anomalous spike in demand. Further, current systems that automatically deallocate resources may base such action upon a temporary drop in usage. In this case, a particular resource may be unavailable when usage returns to normal levels.

SUMMARY OF THE INVENTION

Provided is a method for the deployment of resources in a utility services environment, in which various resources are allocated and deallocated according to a calculated need for those resources. Temporary fluctuations in demand for a particular resource may skew demand for that particular resource. For example, if the need for a resource is measured at the same time the resource is being allocated, or "provisioned," additional provisioning may be initiated even though the needed resources have been, or are in the process of being, provided. In the alternative, a drop in usage of a resource may initiate a request for deallocation, or "deprovisioning," even though the resource has recently been deprovisioned. The claimed subject matter enables the utility services environment to stabilize prior to the execution of a decision regarding the allocation or deallocation of a resource.

Basically, the current invention provides a "weighted" period of time corresponding to requests for a particular resource. Provisioning requests are persisted for variable lengths of time so that metrics corresponding to that resource are able to stabilize. This stabilization enables more intelligent decisions to be made concerning the allocation and deallocation of resources in the utility computing environment.

The weighted period of time is determined by best practices, or more specifically, a length of time corresponding to the time necessary to provision or deprovision the resource and to stabilize metrics collected for that resource. A configuration file stores information on each resource in the utility services environment and a weighted period of time value corresponding to each resource. A list of provisioning/deprovisioning actions corresponding to each resource is maintained. Each provisioning/deprovisioning action is correlated with a time of execution.

When a request for a provisioning/deprovisioning action is received for a particular action, the list of actions and the configuration file are examined to determine whether or not the requested action has been executed with respect to the particular action within the weighted period of time. If so, the request is discarded without any action taken. If not, the action is executed and a corresponding entry is added to the list of actions. Periodically, actions in the list that fall outside the weighted period of time are removed form the list.

BRIEF DESCRIPTION OF THE DRAWINGS

A better understanding of the present invention can be obtained when the following detailed description of the disclosed embodiments is considered in conjunction with the following drawings, in which.

DETAILED DESCRIPTION OF THE FIGURES

Although described with particular reference to a UMI environment, the claimed subject matter can be implemented in any information technology (IT) system in which the automatic allocation and deallocation of resources is desirable. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program author data for use by or in conjunction with an instruction execution system, apparatus or device. Memory and recording medium can be, but are not limited to, an electronic, magnetic, optical, electromagnetic, infrared or semiconductor system, apparatus or device. Memory and recording medium also include, but are not limited to, for example the following a portable computer diskette, a random access memory (RAM), a read-only memory (ROM), an erasable programmable read-only memory (EPROM or flash memory), and a portable compact disk read-only memory or another suitable medium upon which a program and/or data may be stored.

Figure 1:
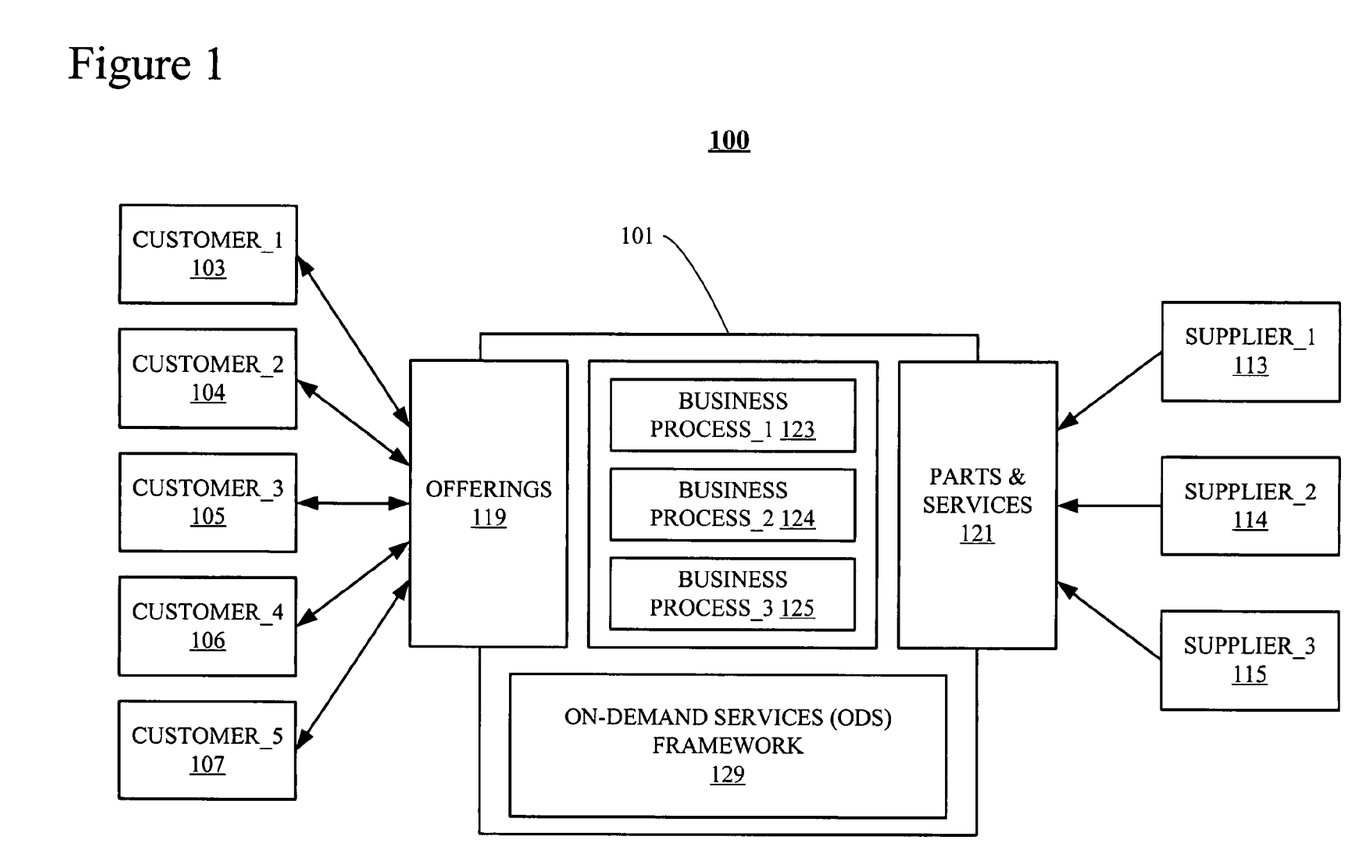
FIG. 1 is a black diagram of an exemplary Universal Management Infrastructure (UMI) architecture incorporating the claimed subject matter.

Turning now to the figures, FIG. 1 is a block diagram of an exemplary Universal Management Infrastructure (UMI) architecture 100 incorporating the claimed subject matter. An enterprise 101 services a number of customers, such as a customer_1 103, a customer_2 104, a customer_3 105, a customer_4 106 and a customer_5 107. Enterprise 101 also has relations with a number of suppliers, a supplier_1 113, a supplier_2 114 and a supplier_3 115. For the sake of this example, the particular type of business engaged in by enterprise 101 is not specified because UMI architecture 100, as well as the claimed subject, matter can be applied to practically any type of business that employs an information technology (IT) infrastructure. In fact, UMI architecture 101 can even apply to a hypothetical business that does not have customers and/or suppliers.

In this example, suppliers 113-5 provide parts and services 121 to enterprise 101 and customers 103-7 purchase products, or offerings, 119. Enterprise 101 includes a business process_1 123, a business process_2 124 and a business process_3 125 to enable enterprise 101 to convert parts and services 121 into offerings 119. Examples of types of business processes include, but are not limited to, a manufacturing supply system, an accounting system, a billing system, a customer management system and a payroll system. The specific number of customers 103-7, suppliers 113-5 and business processes 123-5 are used for the sake of an example only; the claimed subject matter applies equally well to small, medium and large enterprises with any particular number of such relationships.

Enterprise 101 incorporates a virtualized infrastructure, or an "On-Demand services (ODS) Framework," 129, which, in this example, is an e-business on demand (EBOD) utility computing environment designed by International Business Machines Corp. (IBM), of Armonk, N.Y. The IBM utility computing environment is designed for business customers and delivers, for example, accounting, human resource, and customer relationship management applications for a usage-based charge.

Figure 2:
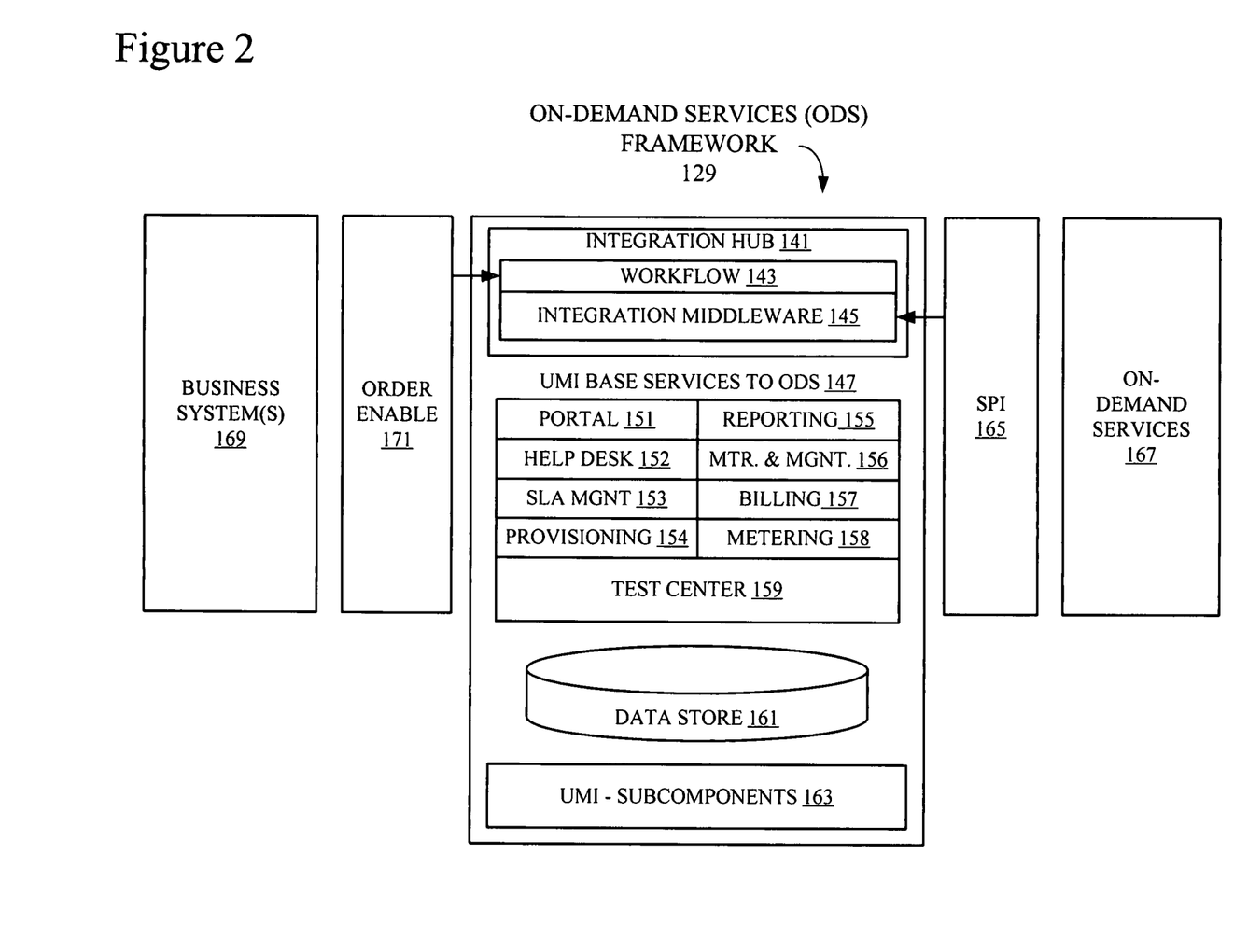
FIG. 2 is a block diagram an On-Demand Service (ODS) framework in which the claimed subject matter may be implemented.

FIG. 2 is a block diagram of ODS Framework 129 of FIG. 1 in more detail. Included in FIG. 2 is an ODS block 167 representing the various on-demand services that may be available in an ODS environment such as the IBM EBOD utility environment. As mentioned above, examples of ODS services include, but are not limited to, a manufacturing supply system, an accounting system, a billing system, a customer management system and a payroll system. In this example ODS services 167 are coupled to ODS framework 129 via a service programming interface (SPI) 165. In this example, SPI 165 is a set of application programming interfaces (APIs). Those with skill in the computing arts should recognize that there are other ways to implement the connection between ODS block 167 and ODS framework 129 other than via SPI 165, such as but not limited to secure sockets.

Also included in FIG. 2 is a business systems block 169, which represent any or all particular business process 123-5 (FIG. 1) that may be required to provide access to one or more of the various ODS services offered by enterprise 101 (FIG. 1). Business systems 169 is coupled to ODS framework 129 via an order enable block 171, which can represent software, hardware or human operators for communicating information from business systems to ODS framework 129.

ODS framework 129 includes an integration hub 141 for coordinating the interactions among business system 169, ODS services 167 and ODS framework 129. Integration hub 141 includes a workflow component 143 and an integration middleware component 145. Workflow component 143 manages communication and requests from business systems 169 and integration middleware component 145 communication and requests from ODS block 167. While workflow component 143 communicates primarily with integration middleware component 145, integration middle ware component 145 is responsible for handling communication and requests from both workflow component 143 and ODS services block 167 to and from a UMI base services 147 to ODS component 167.

UMI base services 147 include a portal 151, which is a communications interface between UMI base services 147, the rest of ODS framework 129 and any entity, such as software from another vendor, that is external to ODS framework 129 and requires a direct communication link to UMI base services 147. Those with skill in the computing arts will realize there are a number of methods of implementing portal 151, including but not limited to, APIs and secure sockets. Additional components of UMI base services 147 include a help desk component 152, a service level agreement (SLA) component 153, a provisioning component 154, a reporting component 155, a Monitoring and Management component 156, a billing component 157, a metering component 158 and a test center component 159.

Help desk component 152 may be either an automated system such as a typical telephone response system or a fully or partially human staffed system in which help desk component 152 serves to automate communication and data retrieval tasks for employees that work at a corresponding help desk department of enterprise 101.

Service level agreement (SLA) management component 153 monitors and controls the interactions between OSD framework 129 and who or whatever interacts with ODS framework 129, such as customers 103-7 (FIG. 1) and/or suppliers 113-5 (FIG. 1). A SLA is typically a contractual agreement between the provider of ODS framework 129 and a particular customer or supplier concerning the amount of resources of ODS framework 129 to which the customer or supplier is entitled. In other words, SLA management component 153 determines whether or not a particular customer or supplier is meeting, exceeding or otherwise complying with their specific SLA and then takes appropriate actions based upon that information. Data concerning SLAs is stored in a data store 161.

Provisioning engine 154 provides for the automation of tasks and the distribution of resources related to the setup and modification of accounts within ODS framework 129. Specifically, provisioning engine 154 enables the creation, modification and removal of resources such as servers, data storage, network resources and firewalls from ODS framework 129. In addition, provisioning engine 154 facilitates the distribution of software within the ODS framework 129.

Reporting component 155 is responsible for the production of reports on any or all of enterprise 101, business processes 123, 125 and 127, a corresponding customer 103-7 or supplier 113-5 and ODS framework 129. Reports may include, but are not limited to, production reports, billing reports, inventory reports, customer reports, performance reports and SLA compliance reports. Pre-defined report templates and generated reports are stored in data store 161.

Monitoring and Management (M&M) component 156 is responsible for the collection of information on and provides the interface for the management of OSD framework 129 and the other UMI base services 147. Collected information is stored in data store 161 and is made available, either directly or through data store 161, to help desk 152, reporting component 155 and a billing component 157, explained below.

Billing component 157 produces invoicing and billing information for customers and suppliers for their respective use of ODS framework 129, based primarily on information from SLA management component 153, and a metering component 158, described below.

Metering component 158 keeps track of customers 103-7 and suppliers 113-5 use of ODS framework 129, as well as any necessary internal information relative to the operation of ODS framework 129. Information collected by metering component 158 is stored in data store 161 and available for use by help desk component 152, reporting component 155, M&M component 156 and billing component 157.

Finally, test center component 159 controls such activities as customer profiling, test data generation, and test storage and scheduling for ODS framework 129. Test center component 159 is explained in more detail below in conjunction with FIG. 5.

Figure 3:
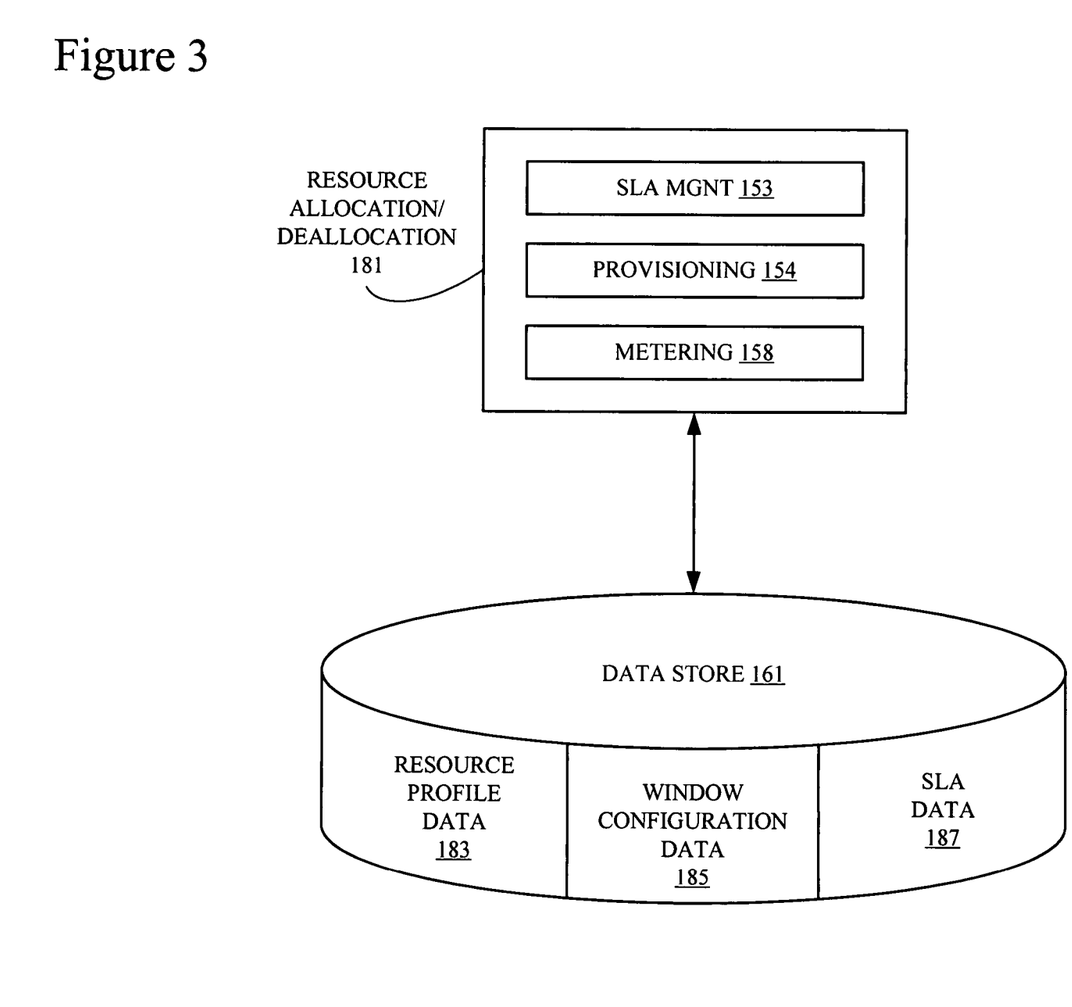
FIG. 3 is a block diagram of a particular portions of the ODS framework, illustrated in FIG. 2, that are relevant to the claimed subject matter.

FIG. 3 is a block diagram of a portions of ODS framework 129, illustrated above in FIG. 2, that implements the claimed subject matter. A Resource Allocation/Deallocation logical block 181 includes SLA Management component (FIG. 2), Provisioning component 154 (FIG. 2) and Metering component 158 (FIG. 2). Although only components 153, 154 and 158 are illustrated as part of Resource Allocation/Deallocation logical block 181, other components may also be involved in with the claimed subject matter. For example, Billing component 157 may be involved because the allocation and/or deallocation of resources can change a particular customer's cost of service calculation. Reporting component 155 may be impacted because a customer needs to be informed concerning resource actions, e.g. provisioning and deprovisioning events.

Metering component 158, which as explained above in conjunction with FIG. 2, keeps track of customers 103-7 and suppliers 113-5 use of ODS framework 129, also records requests for resource actions such as the provisioning and deprovisioning of resources. Information relating to provisioning and deprovisioning and other resource actions is stored in a Window Configuration (WC) data 185 of data store 161. The makeup of memory associated with WC data 185 is explained in more detail below in conjunction with FIG. 4.

Provisioning engine 154, which as explained above in conjunction with FIG. 2 provides for the automation of tasks and the distribution of resources related to the setup and modification of accounts within ODS framework 129, also determines whether or not a particular request for a provisioning or deprovisioning of a particular resource is warranted according to the parameters of the claimed subject matter. Examples of impacted resources include, but are not limited to, servers, data storage, network resources and firewalls. An Allocation/Deallocation process 250 is explained in more detail below in conjunction with FIG. 6.

SLA Management component 153 is included in Resource Allocation/Deallocation block 181 because any allocation and deallocation of a particular resource may be impacted by the parameters of a specific customer's service level agreement. In other word, even though a particular service is needed by a customer according to the disclosed method, the customer's SLA may preclude the allocation of that resource.

In addition to containing WC data 185, data store 161 also includes Resource Profile (RP) data 183 and SLA data 187. RP data 183 includes information concerning clients' resources allotments in ODS framework 129 as well as any other available resources. Examples of allocated resources might include, but are not limited to, processing cycles, number of required servers, network bandwidth and data storage requirements. Each of the allocated resources have parameters associated with them, such as a base resource allotment, a maximum resource allotment, a resource cost and rules for dynamically reallocating the resources based upon the client's workload demand. An example of an available resource is the types of available processors. SLA Data 187 includes information concerning customers' SLAs, which is employed by SLA Management component 153 for, among other things, to determine whether or not a particular customer can allocate additional resources.

Figure 4:
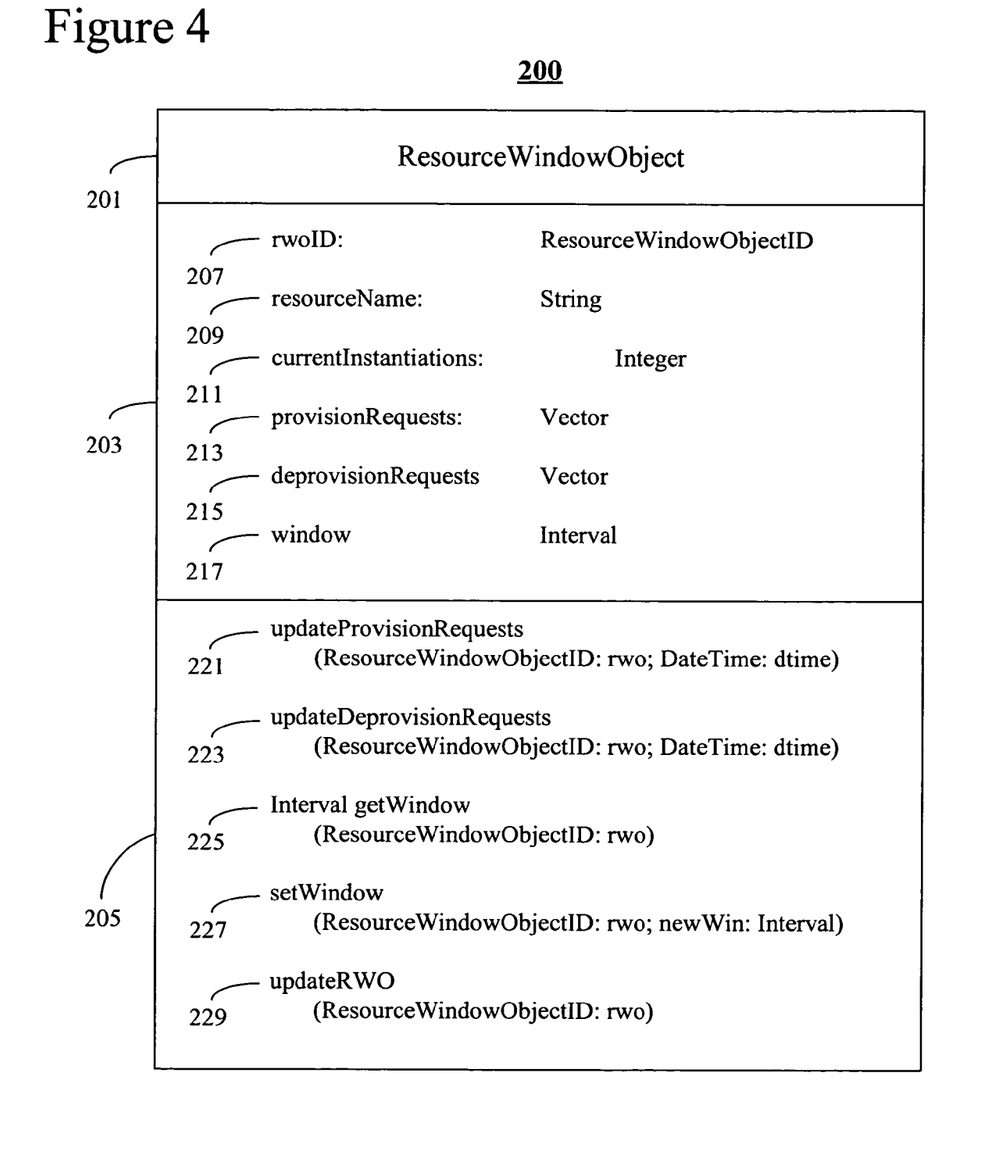
FIG. 4 is an exemplary memory object employed in an implementation of the claimed subject matter.

FIG. 4 is an exemplary ResourceWindowObject (RWO) memory object 200 that may be employed to implement the claimed subject matter. RWO memory object 200 includes a title section 201, which merely states the name of object 200, an attribute section 203, which contains memory elements, or attributes, associated with RWO memory object 200, and a method section 205, which includes functions, or methods, that may be executed in conjunction with RWO memory object 200.

Attribute section 203 includes a "rwoID" attribute 207, a "resourceName" attribute 209, a "currentInstantiations" attribute 211, a "provisionRequests" attribute 213, a "deprovisionRequests" attribute 215 and a "window" attribute 217. Instantiations of object 200 are stored in WC data 185 (FIG. 3) of data store 161 (FIGS. 2 and 3).

RwoID attribute 207 is a variable of type ResourceWindowObjectID that contains a reference to the particular instance of object 200. Each instance of object 200 has a unique value for attribute 207 that allows each instance to be uniquely identified. ResourceName attribute 209 is a variable of type String that stores the name of a resource associated with a particular instantiation of object 200. Both rwoID attribute 207 and ResourceName attribute 209 can be employed by process 250 to locate information concerning a particular resource prior to the allocation or deallocation of that resource.

CurrentInstantiations attribute 211 is a variable of type Integer that stores the number of instantiations of the corresponding resource. The number of instantiation of a particular resource may influence whether or not the corresponding resource is provisioned or deprovisioned, irrespective of the result of the calculations executed in accordance with the claimed subject matter. For example, if the resource is a disk drive, an entry in RP data 183 (FIG. 3) indicates that there must be at least one provisioned disk drive, and the value of currentInstantiations attribute 211 is equal to '1', then a request to deprovision the resource is denied. If the number of instantiations is equal to '5' and SLA data 187 (FIG. 3) indicates that the customer is only contractually entitled to five (5) disk drives, then a provisioning request is denied. However, other components of ODS framework 129, such as Reporting component 155, may notify a user of the denial and suggest a modification of a SLA may be in order.

ProvisionRequests attribute 213 is a variable of type Vector that stores information corresponding to the dates and times that the corresponding resource was requested provisioned, as well as information regarding whether or not the request was executed or ignored. In other words, attribute 213 contains a historical record of provisioning events with respect to the resource identified by resourceName attribute 209. Similarly, deprovisionRequests attribute 215 is a variable of type Vector that stores information corresponding to the dates and times that the corresponding resource was deprovisioned. In other words, attribute 215 contains a historical record of deprovisioning events with respect to the resource identified by resourceName attribute 209.

Window attribute 217 is a variable of type Interval that stores a calculated interval of time employed in the calculation of whether or not a particular provisioning or deprovisioning event should be executed. Attribute 217 is referred to throughout the specification as a Provisioning/Deprovisioning (D/P) window. The calculation of a specific value for attribute 217 is explained in more detail below in conjunction with FIG. 5. The use of attribute 217 is explained more fully below in conjunction with FIG. 6. In an alternative embodiment, a two or more values are calculated and stored, for example, one corresponding to a provisioning window and another to a deprovisioning window.

Method section 205 of object 200 includes an "updateProvisionRequests" method 221, an "updateDeprovisionRequests" method 223, a "getwindow" method 225, a "setWindow" method 227 and an "updateRWO" method 229.

UpdateProvisionRequests method 221 is called when a request to provision a resource is initiated or when provisionRequests attribute 213 is periodically purged of older entries. A request to provision a resource or update provisionRequests attribute 213 may be initiated either programmatically or in response to an explicit request by a user. When a provisioning event occurs, method 221 is called with two (2) arguments: "rwo," a ResourceWindowObjectID argument that uniquely identifies an instance of object 200 to be updated and "dtime," a variable of type DateTime that stores the date and time of the request for inclusion in provisionRequests attribute 215.

When method 221 is called to purge provisionRequests attribute 213, the value of the dtime argument is set to a value of NULL and provisioning events that occurred some multiple of the length of time represented by attribute 217 are removed from the vector. In this manner, enough information is stored in provisionRequests attribute 213 so that attribute 213 can be used, if necessary, in the calculation of window attribute 217 but attribute 213 is not allowed to grow uncontrollably in size.

Similarly, UpdateDeprovisionRequests method 223 is called when a request to deprovision a resource is initiated or when deprovisionRequests attribute 215 is periodically purged of older entries. A request to deprovision a resource or update deprovisionRequests attribute 215 may be initiated either programmatically or in response to an explicit request by a user. When a deprovisioning event occurs, method 223 is called with two (2) arguments: "rwo," a ResourceWindowObjectID argument that uniquely identifies an instance of object 200 to be updated and "dtime," a variable of type DateTime that stores the date and time of the request for inclusion in deprovisionRequests attribute 217.

When method 223 is called to purge deprovisionRequests attribute 215, the value of the dtime argument is set to a value of NULL and deprovisioning events that occurred some multiple of the length of time represented by window attribute 217 are removed from the vector. In this manner, enough information is stored in deprovisionRequests attribute 215 so that attribute 215 can be used, if necessary, in the calculation of P/D window attribute 217 but attribute 215 is not allowed to grow uncontrollably in size.

GetWindow method 225 is called with a ResourceWindowObjectID argument and returns the value stored in window attribute 217 of the corresponding object 200. SetWindow method 227 is called with a ResourceWindowObjectID argument, an argument "newWin" of type Interval and acts to store in window attribute 217 of the corresponding object 200 the value passed in the newWin argument. UpdateRWO method 229 is called with an argument of type ResourceWindowObjectID and initiates an update of provisionRequests attribute 213, deprovisionRequests attribute 215 and window attribute 217. More specifically, method 229 causes attributes 213 and 215 to be updated in a fashion similar to that explained above in conjunction with methods 221 and 223, respectively. Further, the value of window attribute 217 is recalculated based upon information stored in attributes 213 and 215 and RP data 183.

A getRwoID method (not shown) is employed to determine the value of rwoID attribute 207 if a user or program only knows the name of a resource. A resourceName argument of type String is passed to getRwoID method and a value corresponding to rwoID attribute 207 is returned.

It should be understood that RWO object 200 is only one example of a memory object that may be used to implement the claimed subject matter. Other memory objects with fewer, more and/or different attributes and methods may be employed. In addition, there are many ways other than employing object 200 to implement the functionality and data storage of the claimed subject matter. For example, the claimed subject matter may be implemented by means of a computer program in conjunction with a relational database.

Figure 5:
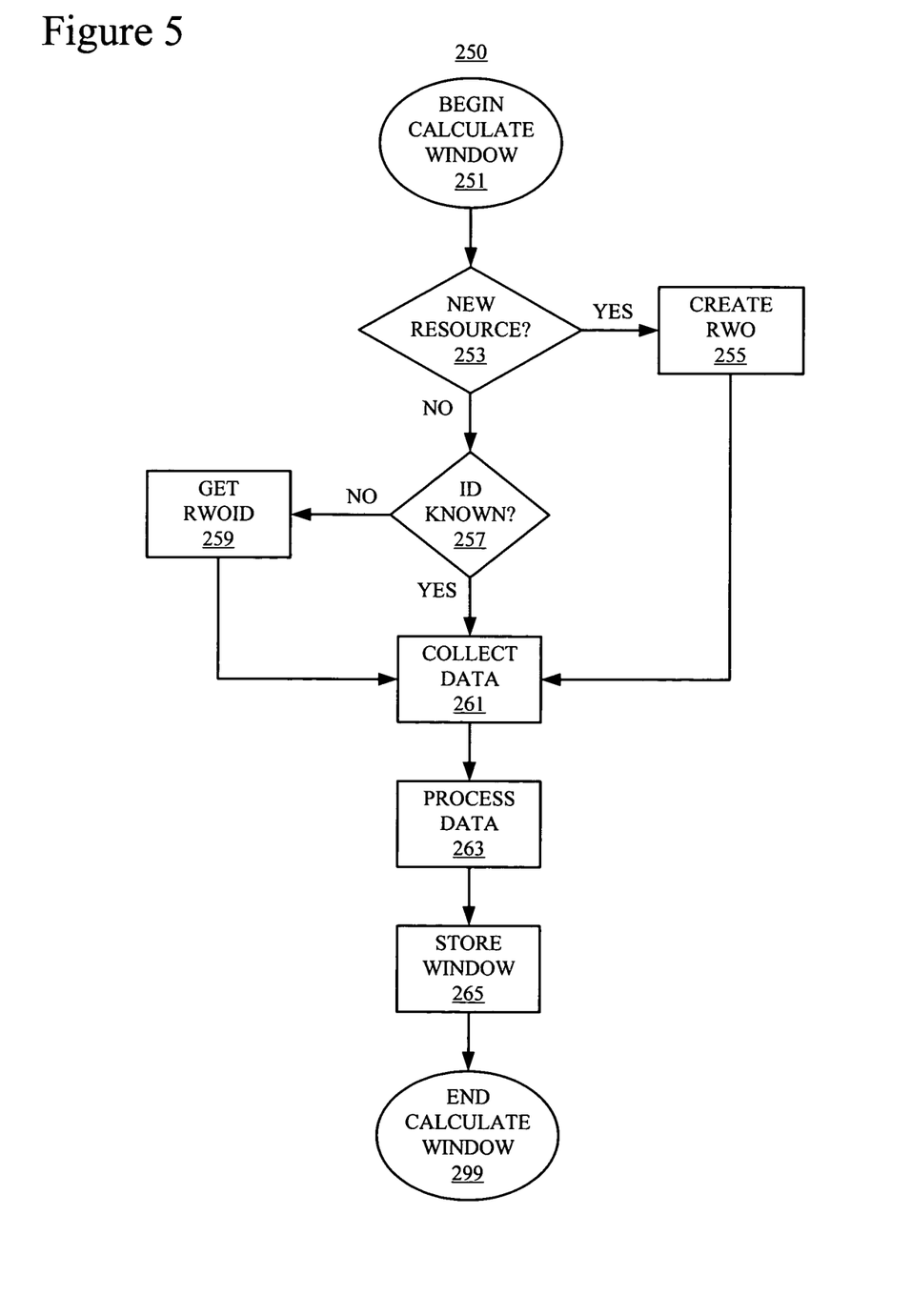
FIG. 5 is a flowchart of a Calculate Window process incorporated in the claimed subject matter.

FIG. 5 is a flowchart of an exemplary Calculate Window process 250, which is incorporated into the claimed subject matter. Process 250 starts in a "Begin Calculate Window" block 251 and control proceeds immediately to a "New Resource?" block 253, during which process 250 determines whether or not the resource for which a P/D window is being calculated corresponds to resource under control of the claimed subject matter. If not, control proceeds to a "Create RWO" block 255 during which process 250 creates a new instantiation of RWO memory object 200 (FIG. 4).

If, in block 253, process 250 determines that the resource does correspond to resource under the control of the claimed subject matter, then control proceeds to an "ID Known?" block 257 during which process 250 determines whether or not the resource being referred to by name or by rwoID 207. If the resource is referred to by name, control proceeds to a "Get RwoID" block 259 during which process 250 calls GetRwoID method to determine the resource's rwoID attribute 207 by which the corresponding memory object 200 is uniquely identified.

From blocks 255 and 259, control proceeds to a "Collect Data" block 261 during which process 250 retrieves, from WC data 185 (FIG. 3), memory object 200 corresponding to the subject resource and any information concerning the resource that may be stored in RP data 183 (FIG. 3) and SLA data 187 (FIG. 3). Control then proceeds to a "Process Data" block 263 during which process 250 calculates a value for a P/D window for the subject resource based upon best practices. More specifically, the P/D window is based upon a length of time necessary to execute a provisioning or deprovisioning and an amount of time necessary for measurements related to the subject resource to stabilize following a provisioning or deprovisioning event. Such information is typically stored in RP data 183. The calculated value for the P/D window can also depend upon values stored in provisionRequests attribute 213 and deprovisionRequests attribute 215, from which process 250 can determine how often the subject resource is subject to provisioning and deprovisioning.

Control then proceeds to a "Store Window" block 265 during which process 250 takes the value for a P/D window calculated in block 263 and stores the value in the appropriate memory object 200 by calling setWindow method 227 (FIG. 4). Memory object 200 is then stored in WC data 185. Finally, control proceeds to an "End Calculate Window" block in which process 250 is complete.

Figure 6:
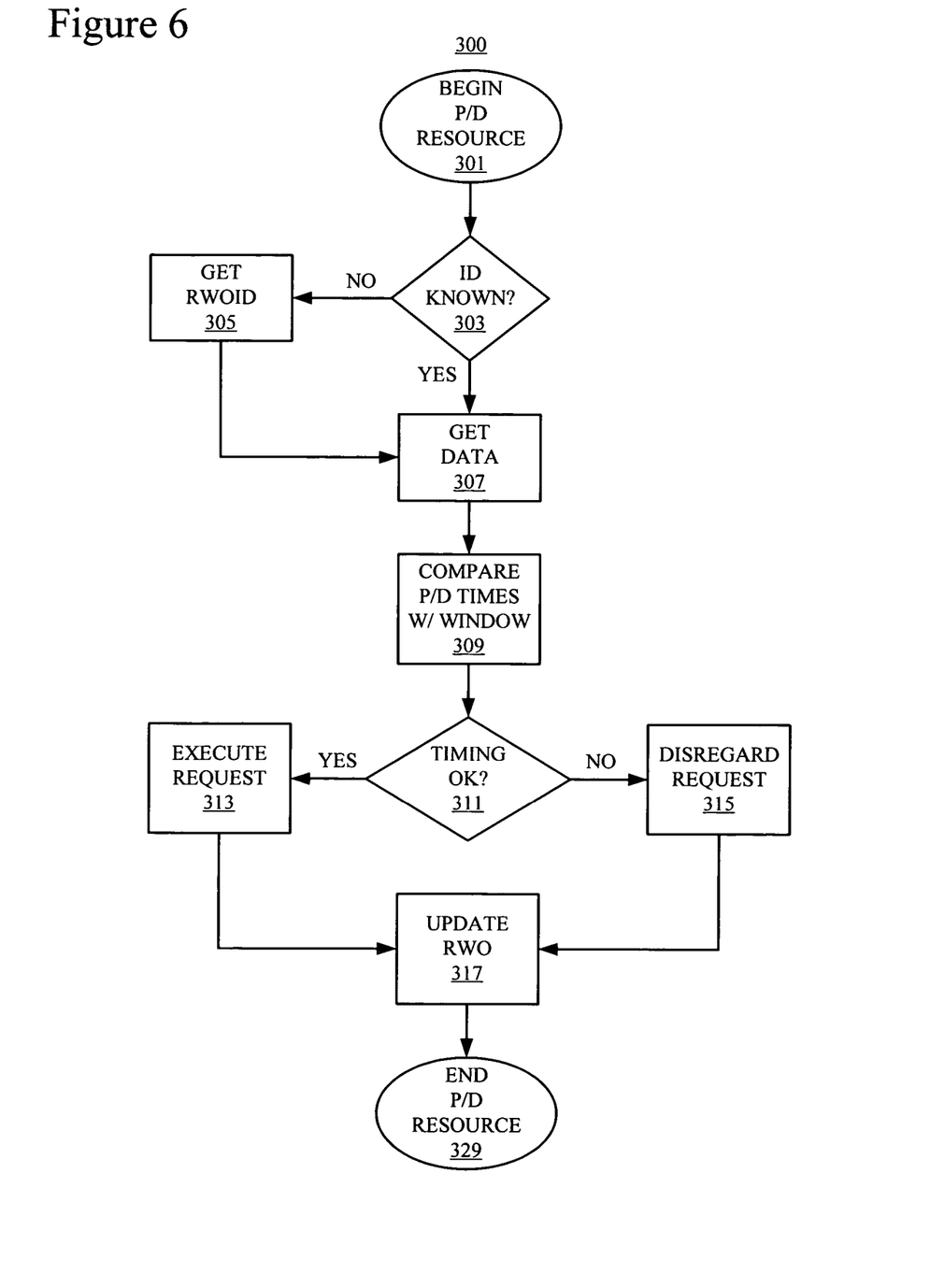
FIG. 6 is a flowchart of an exemplary Provision/Deprovision implementing the claimed subject matter.

FIG. 6 is a flowchart of an exemplary Provision/Deprovision process 300 implementing the claimed subject matter. Although the claimed subject matter is equally applicable to both provisioning and deprovisioning of a resource, the following example is described only in terms of the provisioning of a resource.

Process 300 starts in a "Begin P/D Resource block 301 and control proceeds immediately to an " ID Known? block 303. During block 303, process 300 determines whether or not a received request for a provisioning event is accompanied by a valid rwoID attribute 207 (FIG. 4) or a resourceName attribute 209 (FIG. 4). If the provisioning request contains rwoID attribute 207, then control proceeds to a "Get Data" block 307. If the provisioning request does not contain rwoID attribute 207, then control proceeds a "Get RwoID" block 305 during which process 300 executes GetRwoID method to retrieve attribute 207 corresponding to the name of the requested resource. Control then proceeds to Get Data block 307.

During Get Data block 307, process 300 retrieves object 200 corresponding to the requested resource, as well as RP data 185 (FIG. 3) and SLA data 187 (FIG. 3) corresponding to the requested resource. Control then proceeds to a "Compare P/D Times To Window" block 309 during which process 300 compares the current date and time to the date and times listed in provisionRequests attribute 213 (FIG. 4). Control then proceeds to a "Timing OK?" block 311 during which the difference between the current date and time and the values stored in provisionRequests attribute 213 are compared to the value stored in P/D window attribute 217. If the difference is greater than the value of P/D window attribute 217, then control proceeds to an "Execute Request" block 313 during which the requested resource is provisioned as requested. If, in block 311, the difference is less than the value in P/D window attribute 217, then control proceeds to a "Disregard Request" block 315 during which process ignores the request for the resource.

Following blocks 313 and 315 control proceeds to an "Update Rwo" block 317 during which process 300 executes updateProvisionRequests method 221 to record the provisioning or attempted provisioning. currentInstantiations attribute 211 is also incremented to reflect the addition of the corresponding resource. Of course, if this example was describing a deprovisioning event rather than a provisioning event, updateDeprovisionRequests method 223 would be executed rather then method 223 and currentInstantiations attribute 211 would be decremented rather than incremented.

The example above simplifies the process of deciding whether or not a particular provisioning or deprovisioning request is executed or disregarded. Other factors also play a part in the decision, i.e. information in RP data 183 may indicate that a requested resource is simply not available. Further, information in SLA data 187 may indicate that the customer generating the request is not contractually entitled to a requested additional resource. The claimed subject matter is one factor in a decision to provision or deprovision a particular resource but the claimed subject matter enables a utility services environment to stabilize prior to the execution of a decision regarding the allocation or deallocation of a resource, thus preventing unnecessary and/or duplicative requests from occurring.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method comprising:
calculating, by one or more processors, a time window typically needed to complete a resource action;
storing a time of a first request to execute the resource action, wherein the first request results in a successful completion of the resource action;
receiving a second, subsequent request to execute the resource action;
determining, by the one or more processors, a difference between a time the second request is received and the time of the first request;
automatically executing the resource action pursuant to the second request if the time difference exceeds the time window; and
automatically rejecting the second request as duplicative of the first request if the difference does not exceed the time window;
wherein the wherein the resource action is de-allocation of a resource.

2. A computing system, the system comprising:
a processor;
a non-transitory computer-readable storage device coupled to the processor;
a window data element corresponding to it length of time typically necessary to complete a resource action;
first program instructions to receive a first request to execute the resource action, wherein the first request results in a successful completion of the resource action;
second program instructions to receive a second request to execute resource action;
third program instructions to determine a difference between a time the second request is received with the time of the first request;
fourth program instructions to automatically execute the resource action if the difference exceeds the time window; and
fifth program instructions to automatically reject the second request as duplicative of the first request if the difference does not exceed the time window;
wherein the first, second, third, fourth and fifth program instructions are stored on the non-transitory computer-readable storage device and executed on the processor;
wherein the wherein the resource action is de-allocation of a resource.

3. A computer programming product, comprising:

a non-transitory computer-readable storage device; and first program instructions to calculate a window corresponding to a length of time typically necessary to complete a resource action;

second program instructions to store a time of a first request to execute the resource action, wherein the first request results in a successful completion of the resource action;

third program instructions to receive a second request to execute the resource action;

fourth program instructions to determine a difference between a time the second request is received with the time of the first request;

fifth program instructions to automatically execute the resource action if the difference exceeds the time window; and sixth program instructions to automatically reject the second request as a duplicate of the first request if the time difference does not exceed the time window;

wherein the first, second, third, fourth, fifth and sixth program instructions are stored on the non-transitory computer-readable storage device for execution on a processor;

wherein the wherein the resource action is de-allocation of a resource.

* * * * *